June 24, 1969 F. L. BISHOP 3,451,579
COMPOSITE LAMP ARTICLE WITH GLASS-CERAMIC LAMP ENVELOPE
Filed Aug. 1, 1966
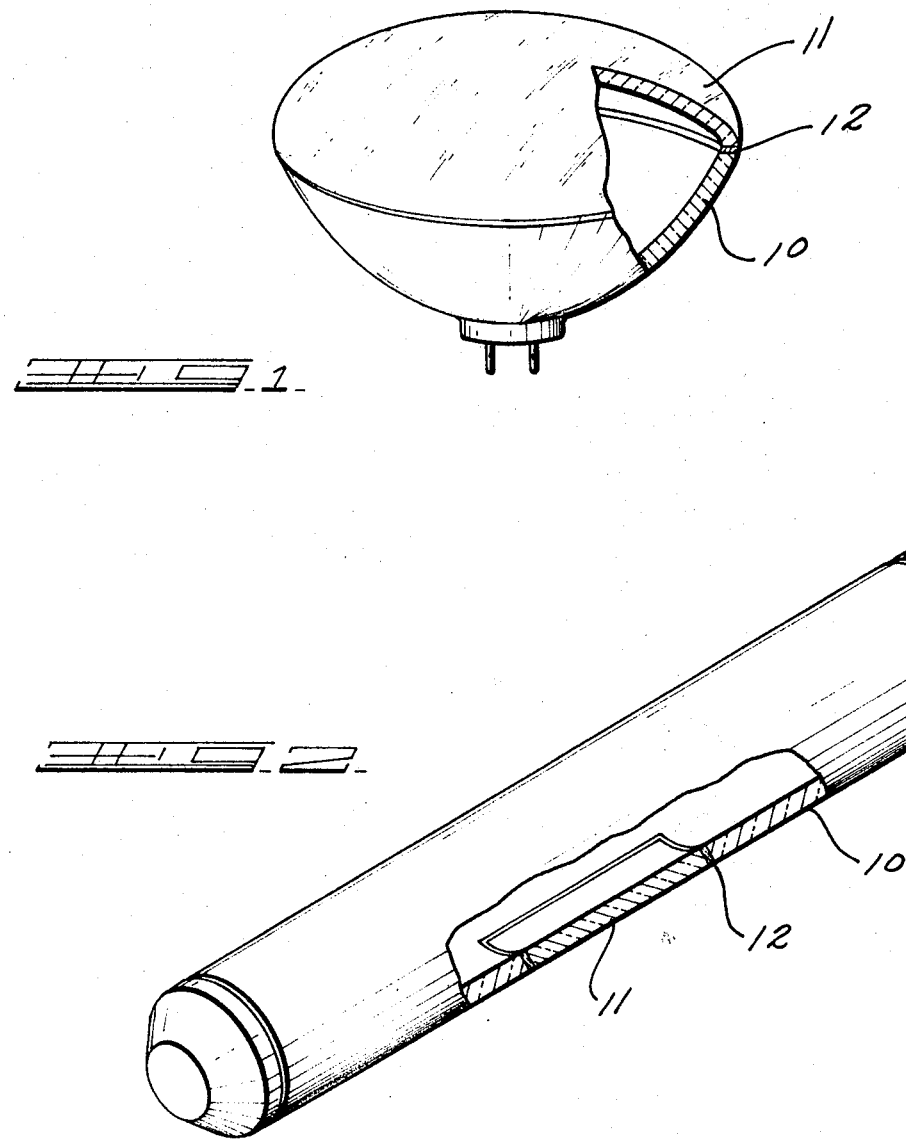
INVENTOR.
FREDERIC L. BISHOP
BY Paul L. Sabatine
W. A. Schaich
ATTORNEYS

United States Patent Office 3,451,579
Patented June 24, 1969

3,451,579
COMPOSITE LAMP ARTICLE WITH GLASS-CERAMIC LAMP ENVELOPE
Frederic L. Bishop, Toledo, Ohio, assignor to Owens-Illinois, Inc., a corporation of Ohio
Filed Aug. 1, 1966, Ser. No. 569,250
Int. Cl. H01j *61/32*
U.S. Cl. 220—2.1       8 Claims This invention relates to an article of manufacture; and, more particularly, the instant invention pertains to an article assembled of separate prefabricated parts to form thereby a single item. Specifically, the subject invention relates to a novel lamp envelope consisting of glass-ceramic and quartz parts intimately joined to form a composite lamp.

Ultra-violet transmitting and infrered heat transmitting lamps are widely used in science and commerce. The ultra-violet transmitting lamps are generally of the mercury vapor type, and they are routinely used as sun lamps and bactericidal lamps. Infrared lamps, because of their ability to heat the object which receives the radiation, are commonly used for drying paints, inks and adhesives, for baking and cooking various foods, for spectrophotometry, night driving and other like uses. The infrared radiation, as used extensively for the purposes of science and commerce is generally emitted from devices which utilize tungsten-filaments, mercury and xenon high intensity short arcs, cesium vapor arc lamps and other special sources.

The lamps, as used for the purposes mentioned above are fabircated in various sizes and shapes, such as tubular, single screw base, double base and as reflector-type lamps. In the manufacture of the above-type lamps, various glasses, such as fused silica glass, arsenic trisulfide glasses, arsenic-modified selenium glass, tellurate glass, calcium aluminate glasses, and the like, are used for lamp construction, for example, for housing the filaments and for transmitting the infrared radiation or the ultra-violet light. The use of these glasses for the lamp construction is often very expensive, and the lamp envelope made of such glasses, as for example, all fused silica, often are fragile and lack directional guidance for the energy produced. Therefore, it will be appreciated by those skilled in the art that if a less expensive and stronger lamp having improved directional, energy guidance characteristics were made available, it would represent a useful contribution to the art, and increase its use in commerce.

Accordingly, it is an object of this invention to provide a novel means for fabricating a lamp.

It is a further object of this invention to provide a means for the manufacture of mercury, infrared lamps and the like.

Still a further object of this invention is to provide a lamp made of a preformed glass-ceramic body with a window of fused silica, having complemental relatively low coefficient of thermal expansion.

Yet a further object of this invention is to provide a lamp possessing a body with good thermal and mechanical properties.

These and other objects will become apparent to those skilled in the art from the following disclosure.

In attaining the objects and advantages of the present invention, it now has been found that mercury vapor and infrared lamps may be made from low expansion glass-ceramics and from fused quartz. The low expansion glass-ceramic is conveniently employed for the body, or bulb envelope of such lamps, and the fused quartz is used as a face, or as a window, for transmitting the produced energy. The silica window as employed in the lamp of the present invention may be used in lamps of common shapes and sizes, for example tubular, pear-shaped, round, bowl, parabolic or globular, and the like. The fused quartz window of the subject lamp is intimately sealed to the glass-ceramic body of the lamp at the desired point by a commercially available sealing glass.

The low expansion glass-ceramics and fused quartz that can be used in the mode and manner of the invention are the commercially available low expansion glass-ceramics, fused quartz and fused silica. In the present case, the expressions "fused quartz" and "fused silica" are used interchangeably, and they are to be construed as functionally equivalent. Generally, by glass-ceramics, as used herein, is meant low expansion, essentially thermal shock resistant, glass-ceramics having a coefficient of expansion of less than about $25 \times 10^{-7}/°$ C. (0–300° C.) and preferably about $20 \times 10^{-7}$ ° C. (0–300° C.), or less, and which possess good working characteristics to facilitate the manufacture of the lamp body by conventional working techniques such as blowing, pressing or spinning techniques. One example, among others, of a suitable low expansion glass-ceramic is a glass-ceramic composition comprising, in weight percent, 69% $SiO_2$, 19% $Al_2O_3$, 4% CaO, 3.8% $Li_2O$, 1.8% $TiO_2$, 2% $ZrO_2$, 0.1% $Na_2O$, and 0.3% $Sb_2O_3$, which when subjected to a heat treatment period at 1375° for 480 hours produces a glass-ceramic having a coefficient of thermal expansion of $0.6 \times 10^{-7}/°$ C. (0–300° C.), a ceramic consisting essentially of 69.9% $SiO_2$, 18% $Al_2O_3$, 4% CaO, 4% $Li_2O$, 3.5% $ZrO_2$, 0.1% $Na_2O$, and 0.3% $Sb_2O_3$, and which possesses a cofficient of thermal expansion of $0.5 \times 10^{-7}/°$ C. (0–300° C.). Still another example is a composition consisting of 64.1% $SiO_2$, 20.9% $Al_2O_3$, 2.7% CaO, 3.7% $Li_2O$, 1.8% $TiO_2$, 2% $ZrO_2$, 0.5% $Na_2O$, 2.9% $B_2O_3$, 1.3% ZnO, and 0.1% $As_2O_3$, and which exhibits an annealing point for the glass of 1225° F., and which are subjected to a heat treating period of 64 hours at 1325° F. forms a glass-ceramic possessing a coefficient of thermal expansion of $3.1 \times 10^{-7}/°$ C. (0–300° C.). In addition to the foregoing examples, the ceramics disclosed in Netherlands patent application No. 6,503,460, and other like low expansion glass-ceramic compositions are also suitable. The above-mentioned glass-ceramics are cited as exemplary and are not to be construed as limiting, as other suitable materials known to those versed in the art may be used in the mode and manner of the instant invention.

According to the practice of the invention, a thin layer of about 0.1 to about 5 millimeters thickness of a vitreous solder glass composition is employed to intimately bond the fused silica window to the ceramic body of the lamp. The sealing glasses employed herein consist of 75 to 80 mole percent $SiO_2$, 8 to 12 mole percent $Al_2O_3$, 10 to 15 mole percent $Cu_2O$, and a sealing glass consisting of 75 to 80 mole percent $SiO_2$, 8 to 12 mole percent $Al_2O_3$, 10 to 15 mole percent $Cu_2O$, and 1 to 3 mole percent $AlF_3$. Examples of more specific sealing glasses employed for sealing the quartz window to the ceramic are glasses of 77.5 mole percent $SiO_2$, 10 mole percnet $Al_2O_3$, and 12.5 mole percent $Cu_2O$, and a glass consisting of 77.0 mole percent $SiO_2$, 9.3 mole percent $Al_2O_3$, 1.3 mole percent $AlF_3$, and 12.5 mole percent $Cu_2O$. The sealing glass compositions reported herein were prepared from Kona Quintas Quartz, Alcoa A-14 Alumina, $AlF_3$, $Cu_2O$, or a high cupric mixture consisting of 15% CuO and 85% $Cu_2O$ to give the desired mole percent of $SiO_2$, $Al_2O_3$, $Cu_2O$ and $AlF_3$. The size of the melt was generally about 5 to 30 kilograms, and the compositions were prepared by blending the batch ingredients, melting in a 90% platinum–10% rhodium or a fused silica container or crucible at 1500 to 1600° C. for 15 to 16 hours in a gas-fired furnace using a slight excess of oxygen.

In attaining the article of the invention, the two parts to be joined, that is, the envelope and the window, are sealed by a vitreous sealing glass consisting essentially of 77.5 mole percent SiO₂, 10 mole percent Al₂O₃, and 12.5 mole percent Cu₂O. The sealing glass may be applied to the edge surface of the fused quartz window, which may be of any desired geometrical shape, such as square, round, etc., or to a like surface of the low expansion ceramic. The sealing glass may be applied in any conventional manner such as bead or paste form. For example, a sealing glass which was previously drawn into a fiber form was applied to a ceramic surface by a hand torch equipped with a No. 3 tip and fueled by a mixture of gas and oxygen. Other seals were fabricated employing a hydrogen-oxygen flame. At no time was the quartz or ceramic surface heated hot enough to glaze the edge or to produce distortion of the surfaces. Typical seals or joints can also be effected by applying a slurry comprising finely divided sealing glass particles in a suitable organic vehicle or carrier onto one or both of the surfaces to be sealed. The slurry composition, which is approximately the consistency of putty, consists of, for example, the powdered or finely divided particles of the sealing glass in nitrocellulose dissolved in amylacetate, with a concentration of about 1 to 3% nitrocellulose in said amylacetate. Other acceptable organic binders may be employed provided they will readily burn off and volatize during the heating procedure employed to produce the glass-ceramic to fused quartz seal. In addition, the organic binder should not react with any of the elements making up the bonded assembly. As examples of other organic binders which can be used are such organic binders as gelatine dissolved in water, nitrocellulose and butylacetate, camphor with cellulose nitrate and the like.

In addition to the flame sealing procedure described above, the assemblying of the preformed quartz and low expansion glass-ceramic parts can be effected by sealing in an oven. For example, the powdered sealing glasses, mixed with a solution of nitrocellulose and amylacetate is applied to at least one of the surfaces to be sealed, and the sealable parts are then intimately joined in an oven at 2200° F., in a nitrogen atmosphere for 15 minutes.

The coefficient of thermal expansion of fused silica is generally about 5 to $6 \times 10^{-7}/°$ C. and it is, therefore, difficult to join to a low expansion glass-ceramic body having an expansion in a different range than fused silica. The sealing glasses as employed herein possess an expansion coefficient of about 4 to $10 \times 10^{-7}/°$ C. and are, therefore, suitable for bonding a fused quartz window to a low expansion glass-ceramic bulb type envelope.

The bulbs of the present invention may be of the common lamp-bulb shapes, and the accompanying drawings are to be liberally construed as illustrative of assembled bulb construction embodying the spirit of the invention.

In the accompanying drawings:

FIGURE 1 shows a conventional pear-shaped bulb wherein the bulb envelope 10 is a low expansion glass-ceramic intimately bonded by a sealing glass 12 to a fused quartz window 13.

FIGURE 2 depicts a tubular lamp of a glass-ceramic envelope 10 with a quartz window 11 intimately bonded to said envelope by sealing glass 12.

I claim:
1. A composite lamp article of manufacture wherein said lamp article comprises sealed parts, said parts consisting of a preformed hollow low thermal coefficient of expansion glass-ceramic envelope and a preformed radiant energy transmitting low expansion silica glass window, both having compatible low coefficients of thermal expansion not in excess of $25 \times 10^{-7}$, the latter intimately bonded to said envelope by a vitreous copper container sealing glass consisting essentially of 75 to 80 mole percent SiO₂, 8 to 12 mole percent Al₂O₃, and 10 to 15 mole percent Cu₂O.

2. An article of manufacture according to claim 1 wherein said silica glass window is comprised of fused silica.

3. An article of manufacture according to claim 1 wherein said ceramic envelope has a coefficient of thermal expansion less than $20 \times 10^{-7}/°$ C. over the range of 0 to 300° C.

4. An article of manufacture according to claim 1 wherein said solder glass consists essentially of 77.5 mole percent SiO₂, 10 mole percent Al₂O₃, and 12.5 mole percent Cu₂O.

5. A composite lamp article of manufacture wherein said lamp article comprises sealed parts, said parts consisting of a preformed hollow low thermal coefficient of expansion glass-ceramic envelope and a preformed radiant energy transmitting low expansion silica glass window, both having compatible low coefficient of thermal expansion not in excess of $25 \times 10^{-7}$, the latter intimately bonded to said envelope by a vitreous copper containing sealing glass consisting essentially of 75 to 80 mole percent SiO₂, 8 to 12 mole percent Al₂O₃, 10 to 15 mole percent Cu₂O, and 1 to 3 mole percent AlF₃.

6. An article of manufacture according to claim 5 wherein said silica glass window is comprised of fused silica.

7. An article of manufacture according to claim 5 wherein said low expansion ceramic has a coefficient of expansion less than $20 \times 10^{-7}/°$ C. over a range of 0 to 300° C.

8. An article of manufacture according to claim 5 wherein said vitreous sealing glass consists of 77.0 mole percent SiO₂, 9.3 mole percent Al₂O₃, 1.3 mole percent AlF₃, and 12.5 mole percent Cu₂O.

References Cited

UNITED STATES PATENTS

| | | | |
|---|---|---|---|
| 2,894,166 | 7/1959 | Mohn | 313—221 |
| 2,904,713 | 9/1959 | Heraeus et al. | 160—52 XR |
| 3,207,936 | 9/1965 | Wilbanks et al. | 313—317 XR |
| 3,298,553 | 1/1967 | Lusher | 65—33 XR |
| 3,363,134 | 1/1968 | Johnson | 313—317 XR |
| Re. 25,791 | 6/1965 | Claypoole | 220—2.1 |
| 2,936,923 | 5/1960 | Veres | 220—2.1 |

HELEN M. McCARTHY, *Primary Examiner.*

U.S. Cl. X.R.

65—33; 106—52; 220—82; 313—317, 218